(12) United States Patent
Martin et al.

(10) Patent No.: US 10,053,827 B2
(45) Date of Patent: Aug. 21, 2018

(54) LIVING SHORELINE PROTECTION AND STABILIZATION SYSTEM AND METHOD

(71) Applicant: Martin Ecosystems, LLC, Baton Rouge, LA (US)

(72) Inventors: Ted Martin, Baton Rouge, LA (US); Chad Martin, Baton Rouge, LA (US)

(73) Assignee: Martin Ecosystems, L.L.C., Baton Rouge, LA (US)

( * ) Notice: Subject to any disclaimer, the term of this patent is extended or adjusted under 35 U.S.C. 154(b) by 0 days.

(21) Appl. No.: 15/233,240

(22) Filed: Aug. 10, 2016

(65) Prior Publication Data

US 2016/0348327 A1 Dec. 1, 2016

Related U.S. Application Data (63) Continuation-in-part of application No. 14/249,555, filed on Apr. 10, 2014, now abandoned.

(51) Int. Cl.
*E02B 3/04* (2006.01)
*E02B 3/12* (2006.01)
*E02D 17/20* (2006.01)

(52) U.S. Cl.
CPC ............. *E02B 3/04* (2013.01); *E02B 3/122* (2013.01); *E02D 17/202* (2013.01); *Y02A 10/16* (2018.01)

(58) Field of Classification Search
CPC . E02B 3/04; E02B 3/125; E02B 3/122; A01G 13/0268; A01G 9/102; A01C 1/044
See application file for complete search history.

(56) References Cited

U.S. PATENT DOCUMENTS

| | | |
|---|---|---|
| 4,610,568 A | 9/1986 | Koerner |
| 4,657,433 A | 4/1987 | Holmberg |
| 4,889,446 A | 12/1989 | Holmberg |
| 5,338,131 A * | 8/1994 | Bestmann ............ E02B 3/12 405/15 |
| 5,507,845 A | 4/1996 | Molnar et al. |
| 5,786,281 A | 7/1998 | Prunty et al. |
| 5,849,645 A * | 12/1998 | Lancaster ............ E02B 3/04 405/15 |
| 5,951,202 A | 9/1999 | Brown |
| 6,929,425 B1 * | 8/2005 | Kimberlin ............ C09K 17/52 405/302.4 |
| 7,775,743 B1 | 8/2010 | Kelley |

(Continued)

*Primary Examiner* — Carib A Oquendo
(74) *Attorney, Agent, or Firm* — John B. Edel; Edel Patents LLC (57) ABSTRACT

A shoreline protection and bank stabilization system and method are provided that creates a living shoreline suitable for a variety of soils and wave energy conditions. A combination of recycled plastic matrix layers of geo-synthetic recycled plastic matrix sheets is employed, including matrix sheets that are planted during installation and those that contain pre-grown vegetation. The sheets are secured on a newly constructed or existing levee, earthen berm or earthen terrace. When installed, the system protects and stabilizes banks and shorelines with a variety of soils including loose organics. The system also stabilizes and protects banks and shorelines from a variety of wave energy environments including open water wave action in coastal waters throughout the United States and internationally, but especially in the coastal environment of Louisiana and the Gulf Coast.

8 Claims, 11 Drawing Sheets

(56) References Cited

U.S. PATENT DOCUMENTS

| | | | |
|---|---|---|---|
| 7,820,560 B2 | 10/2010 | Weiser et al. | |
| 7,950,878 B2 | 5/2011 | Carpenter | |
| 7,992,344 B2 * | 8/2011 | Kim | A01C 1/04 |
| | | | 47/1.01 F |
| 2002/0131826 A1 | 9/2002 | Spangler et al. | |
| 2002/0168234 A1 * | 11/2002 | Hild | B63B 21/04 |
| | | | 405/224 |
| 2004/0247399 A1 * | 12/2004 | Kimberlin | E02D 17/202 |
| | | | 405/302.4 |
| 2010/0178108 A1 * | 7/2010 | Carpenter | E02B 3/126 |
| | | | 405/16 |
| 2014/0255097 A1 * | 9/2014 | van den Berg | E02D 17/20 |
| | | | 405/16 |

* cited by examiner

LIVING SHORELINE PROTECTION AND STABILIZATION SYSTEM AND METHOD

CROSS-REFERENCE TO RELATED APPLICATIONS

This application is a continuation-in-part application which claims priority to U.S. Ser. No. 14/249,555, filed on Apr. 10, 2014.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Field of the Invention

The invention relates generally to devices and methods used in the protection and stabilization of shorelines, levees, earthen berms, and earthen terraces with a variety of soils and slopes, and more particularly to those devices and methods which create a living shoreline by trapping sediments that promote plant growth and establish a riparian edge for aquatic and wildlife habitat.

2. Description of Related Art

Erosion of coastal areas and shorelines, either through natural effects or caused by human activities, is a serious problem for many areas around the world. Many attempts have been made over the years to prevent or control such erosion, resulting in the development of various devices and methods which attenuate wave action and reinforce the shoreline using bulkheads, concrete structures, mats, and similar means.

Spangler (U.S. Pat. Publication No. 2002/0131826) discloses a modular fiber invention for erosion and sediment control. The fibers are slow decaying natural or synthetic fibers which contemplate that this product will degrade over time. The organic soils and erosion problems of coastal Louisiana require solutions that are more permanent in order to hold vegetation in place long enough to achieve growth and stabilization. In addition, Spangler would not be durable enough to handle the high wave energies in many coastal environments. The busting of sacks creates a problem as loose fibers are then scattered throughout the environment.

Molnar (U.S. Pat. No. 5,346,514) discloses sod mats with nylon sod reinforcements for use with sports fields and soil stabilization, also retarding weeds from growing into and through the mats from below. This patent does not address the problems of wave erosion in high energy environments and continuous boat wakes on large navigation channels. In this coastal environment all vegetative growth is necessary. Retarding vegetative growth from below would be counterproductive.

Finally, Kelly (U.S. Pat. No. 7,775,743) discloses a ground surface cover to reduce erosion of levees and shorelines anchoring a concrete matrix mat parallel to the shoreline. While this system does provide substantial protection from high energy waves, it does not include vegetation and thus does not create a living shoreline. The system described in Kelly is also very expensive and time consuming to install in comparison to the present invention.

Natural occurrences such as waves, hurricanes, and floods may destroy ecosystems, as well as wave action attributable to boat traffic and other vehicles. Over time, those ecosystems often recover and mature into diverse healthy environments. Without outside interference, the processes of recovery are normal and inevitable. They include microbial colonization followed by the invasion of plant species and eventually aquatic and wildlife species. In many areas, time is usually the only requirement for such recovery. However, the conditions, both naturally occurring and man-made, that are impacting the Louisiana coastline and similar regions do not allow for this spontaneous recovery. Shoreline erosion is dramatically affecting wetland loss. It is particularly rapid in large bays due to high wave energy and along navigation canals due to boat wakes and water surges associated with the passage of large vessels. The soils are highly organic peat and fluid, making it difficult to stabilize and protect. It is also difficult for newly planted vegetation along levees, berms and terraces to establish and grow because of the highly organic soils, which further contributes to the extensive wetland loss. To meet the challenges posed by the constant high-energy environment and human impact, intentional effort must be directed toward environmental restoration.

While such efforts have been successful to some degree, a primary goal in many areas is reformation and restoration of the shoreline to include native vegetation. In those instances, the objective is to stabilize and reinforce the areas subject to erosion with plants which are typically native to the region. Consequently, an organic ecosystem can eventually be established that is resistant to erosive forces, but using means which do not detract from the natural beauty of the shoreline. These methods are sometimes referred to as "living shorelines", and they provide additional ecological habitat for aqueous as well as terrestrial biology. Living shorelines refers to management practices that use strategic placement of plants, stone, sand fill and other structural organic materials, such as oyster reefs, to provide shoreline stabilization and protection of marsh vegetation and habitat viability. Living shorelines may be used in appropriate areas as alternatives to bulkheads, rip-rap and other hard structures.

Because shoreline topography and conditions are so diverse, living shorelines must often be custom-designed for each location to be successful. According to most researchers, site-specific living shorelines must employ principles from each of the fields of ecology, geology, oceanography and engineering to develop effective projects.

To meet these needs, the present invention provides one of the most environmentally efficient and systematic efforts to harness the natural processes of the South Louisiana coastal ecosystem. The invention, in its preferred and alternative embodiments creates a living shoreline by stabilizing and protecting the existing earthen slope, while also promoting plant growth and establishing a riparian edge for aquatic and wildlife habitat.

SUMMARY OF THE INVENTION

A living shoreline protection and stabilization system and method are provided, comprising one or more base matrix layers of non-woven plastic matrix sheets layered in a stepped format parallel to the shoreline, wherein the base matrix layer or layers protect earthen slopes from mean higher high water to mean lower low water; a narrow strip of non-woven plastic matrix positioned on top of the base matrix layers, wherein the narrow matrix strip is pre-planted with sufficient time to establish and grow in advance of installation with one or more selected plants, and wherein the selected plants in the pre-planted narrow matrix strip have rooting and propagation characteristics sufficient to establish growth of the selected plants through the base matrix layers into the soil and toward the water creating a living shoreline.

The base matrix layer also includes selected plants inserted through the base matrix layer into the soil, wherein the selected plants in the base matrix layer have rooting and propagation characteristics sufficient to establish a natural anchor for the base matrix layer into the shoreline; and wherein the base matrix layer and pre-planted narrow matrix strip are anchored to the shoreline by a plurality of anchors sufficient to cause the base matrix layer to conform to the shoreline. These anchors, typically comprising a 16-gauge wire mesh secured by anchor pins, can be temporary, intermediate or permanent. Temporary anchors will typically comprise an un-galvanized wire mesh. While intermediate anchors will comprise a galvanized wire mesh. Permanent anchors will typically comprise a galvanized and rubber coated wire mesh.

Preferably, the non-woven plastic matrix is made of substantially non-biodegradable polyester fibers from recycled polyethylene terephthalate (PET) plastic. The polyester fibers have a high melting point of at least 260° C. and good insulating properties under cold conditions. In addition, the polyester web design has the advantage of having an open structure yet still retaining high tensile and tear strength. The non-woven matrix provides a protective barrier. These properties create an ideal environment for vegetation to grow and spread. Plant root systems are protected from winds, waves and harsh temperatures while having the ability to mature and flourish. Sediment trapping also occurs within the matrix base matrix layers creating weight and holding capacity and more importantly an organic soil bed for planted vegetation to establish and grow.

In a preferred embodiment, the pre-planted grasses in the pre-planted narrow matrix strip are selected from vegetation native to the project location containing rooting characteristics. This vegetation is planted into the pre-planted narrow matrix strip at an off-site nursery where it is allowed sufficient time to establish and spread before installing the strip at the project site.

More preferably, the bottom of the pre-planted narrow matrix strips are positioned on top of the base matrix layer at mean tide level.

In a preferred embodiment, the selected plants inserted into the base matrix layer are selected from native variants having rooting and propagation characteristics, which are favorable to shoreline protection and stabilization.

In an alternate embodiment, the base matrix layer includes two layers of the plastic matrix, wherein the layers are positioned in at least a partially overlapping position parallel to the water's edge. The number of base plastic matrix layers is site specific and determined by the slope of the shoreline, levee, or earthen berm.

In a further alternate embodiment, the base matrix layer includes three layers of the plastic matrix, wherein the layers are positioned in at least a partially overlapping position parallel to the water's edge. The number of base plastic matrix layers is site specific and determined by the slope of the shoreline, levee, or earthen berm.

In a further alternate embodiment, the base matrix layer includes four layers of the plastic matrix, wherein the layers are positioned in at least a partially overlapping position parallel to the water's edge. The number of base plastic matrix layers is site specific and determined by the slope of the shoreline, levee, or earthen berm.

In a more preferred embodiment, the base matrix layers are positioned progressively toward the water such that a portion of each of the layers is in contact with and caused to conform to the soil below.

In most embodiments, the shoreline is shaped and graded to a predetermined condition prior to installation of the base matrix layers.

In a more preferred embodiment, each base matrix layer is about 7.5 feet wide in a direction substantially perpendicular to the shoreline. With overlapping of the base matrix layers the approximate total distance perpendicular to the shoreline of the different embodiments is 12 feet for 2 base matrix layers, 15 feet for 3 base matrix layers and 20 feet for 4 base matrix layers. Each base matrix layer is positioned on the shoreline in continuous 90 foot lengths in a direction substantially parallel to the shoreline. Each base matrix layer is about 2 inches thick. Also, the pre-planted narrow matrix strip is about 24-36 inches wide in a direction substantially perpendicular to the shoreline, and is positioned on the base matrix layer in strips 15 foot long in a direction substantially parallel to the shoreline.

The anchors comprise an anchor plate having a plurality of holes formed therein, and an elongated reinforcement bar staple inserted through the anchor plate and driven into the shoreline.

The plurality of anchors sufficient to cause the base matrix layer to conform to the shoreline can be temporary, intermediate or permanent.

The above and other objects and features of the present invention will become apparent from the drawings, the description given herein, and the appended claims.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
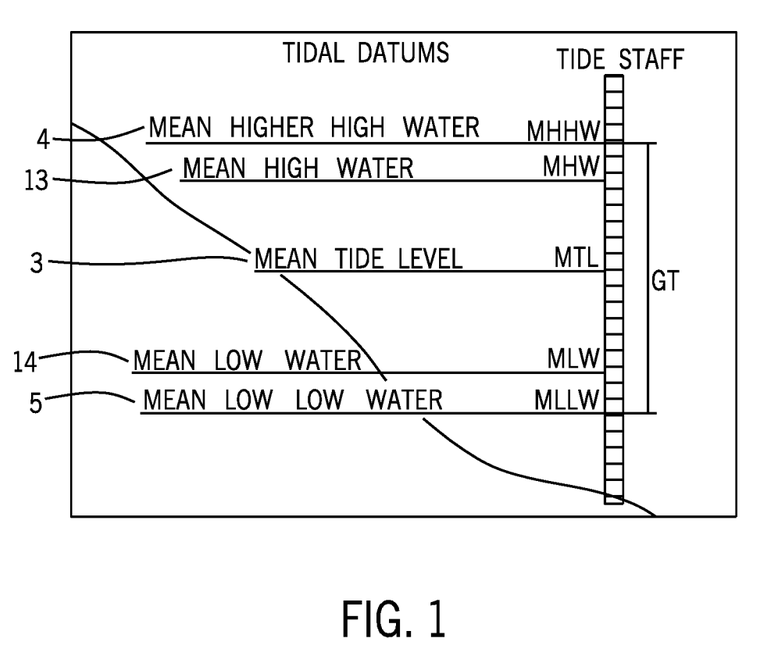
FIG. 1 illustrates the tidal datums for referencing placement of the base matrix layers and pre-planted matrix strips.

Based on definitions established by the National Oceanic and Atmospheric Administration (NOAA), the following terms are used herein to describe the position of various components used in the present invention, including the various layers and plants, which work in combination to provide stability to the earthen slope. For example, mean higher high water (MHHW) 4 is the average height of the highest tide recorded during a particular recording period, as shown in FIG. 1 Mean high water (MEW) 13 is the average height of all high waters recorded during a particular recording period. Mean low water (MLW) 14 is the average height of the low waters during a particular recording period. Mean lower low water (MLLW) 5 is the average height of the lowest tide recorded at a tide station each day during a particular recording period. Great Diurnal Range (GT) is the difference in height between MHHW and MLLW.

Figure 2:
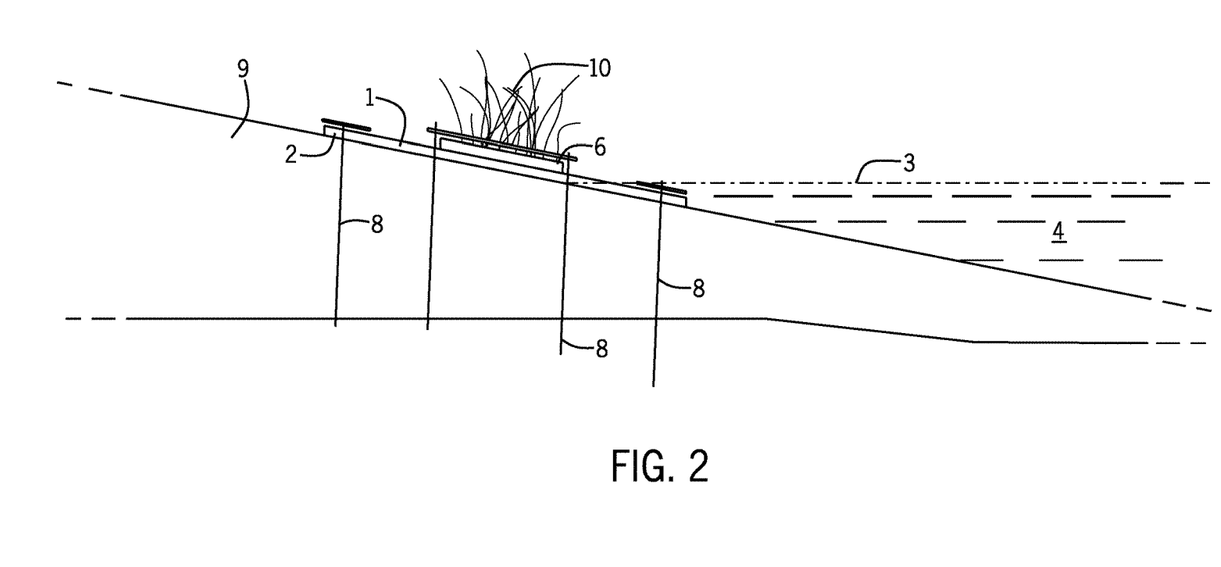
FIG. 2 illustrates a cross section of a simple embodiment of a living shoreline protection and stabilization system of the present invention depicting a single base matrix layer with pre-planted narrow matrix strip and anchor pins.

Referring now to FIG. 2, a simple embodiment of a living shoreline protection and stabilization system 1 of the present invention is depicted as having a single base matrix layer 2. The base matrix layer 2 is preferably a non-woven plastic matrix positioned on a shoreline, wherein the base matrix layer 2 is at least partially submerged in the water. A pre-planted narrow matrix strip 6 of non-woven plastic matrix planted with native vegetation with adequate time for plants to establish and grow is positioned on top of the base matrix layer 2, wherein the bottom of the pre-planted narrow matrix strip 6 is approximately the same level as mean tide level 3 at the shoreline. Preferably, the non-woven plastic matrix is a recycled polyethylene terephthalate (PET) plastic containing no phenol-formaldehyde resins with enough thickness to trap sediments protecting plant roots and allowing them to grow. The base matrix layer 2 and the pre-planted narrow matrix strip 6 are anchored to the earthen slope 9 below by a plurality of anchors 8 sufficient to cause the base matrix layer 2 to conform to the earthen slope 9.

Figure 6:
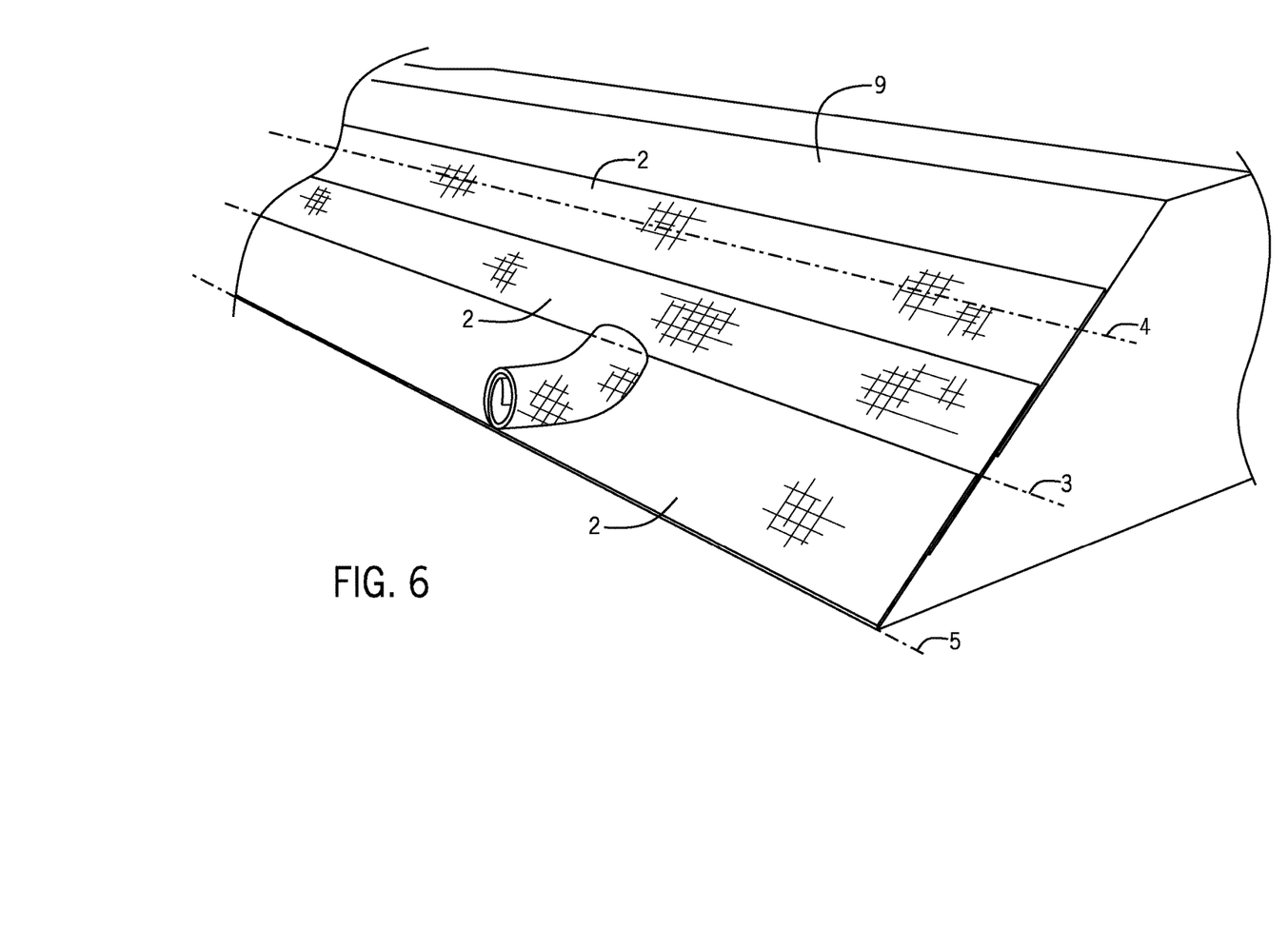
FIG. 6 illustrates the placement of the base matrix layers in relation to the tidal datums of mean higher high water (MHHW) and mean lower low water (MLLW).

One example of a non-woven plastic matrix used in the present invention is the JCII Island Brown product manufactured by Americo Manufacturing Company, Inc., which employs only water-based latex resins and is constructed entirely from post-consumer products such as recycled water and soda bottles. The material is non-toxic to fish and other aquaculture, and it can easily be applied from rolls onto the shoreline as best shown in FIG. 6. The polyester fibers have a high melting point of at least 260° C. and good insulating properties under cold conditions. In addition, the polyester web design has the advantage of having an open structure yet still retaining high tensile and tear strength. The non-woven matrix provides a protective barrier. These properties create an ideal environment for vegetation to grow and spread. Plant root systems are protected from winds, waves and harsh temperatures while having the ability to mature and flourish. Sediment trapping also occurs within the base matrix layers creating weight and holding capacity and more importantly an organic soil bed for planted vegetation to establish and grow.

In a preferred embodiment, the pre-planted narrow matrix strip 6 is pre-planted with one or more pre-planted native grasses 10. The pre-planted native grasses 10 require approximately 45 to 60 days to become established prior to installation. It will be appreciated that a variety of plants may be suitable, including vegetation having equivalent rooting and propagation characteristics. Importantly, the pre-planted narrow matrix strip 6 and its pre-planted grasses 10 are positioned roughly so that the bottom of the strip is at mean tide level 3. It is also important that the pre-planted grasses 10 in the pre-planted narrow matrix strip 6 have rooting and propagation characteristics sufficient to establish growth of the pre-planted grasses 10 through the base matrix layer 2, anchoring into the earthen slope 9 below and toward the water 4. When such growth occurs, the expansion of the pre-planted native grasses 10 toward the water creates a living shoreline having a number of beneficial effects. First, as the base matrix layer 2 and pre-planted narrow matrix strip 6 become covered with plants, the plants serve to protect the shoreline from erosive waves. It also serves to stabilize the soils below the base matrix layers 2. Sediment is also trapped within the plastic matrix creating weight and natural anchoring, while also creating an organic rich environment for vegetation to grow. The covering of plants protects the underlying base matrix layers 2 from ultraviolet (UV) radiation and consequent degradation, prolonging the structural integrity of the matrix. Furthermore, plant growth into the water 4 creates a living shoreline which provides habitat for aquatic life.

Figure 3:
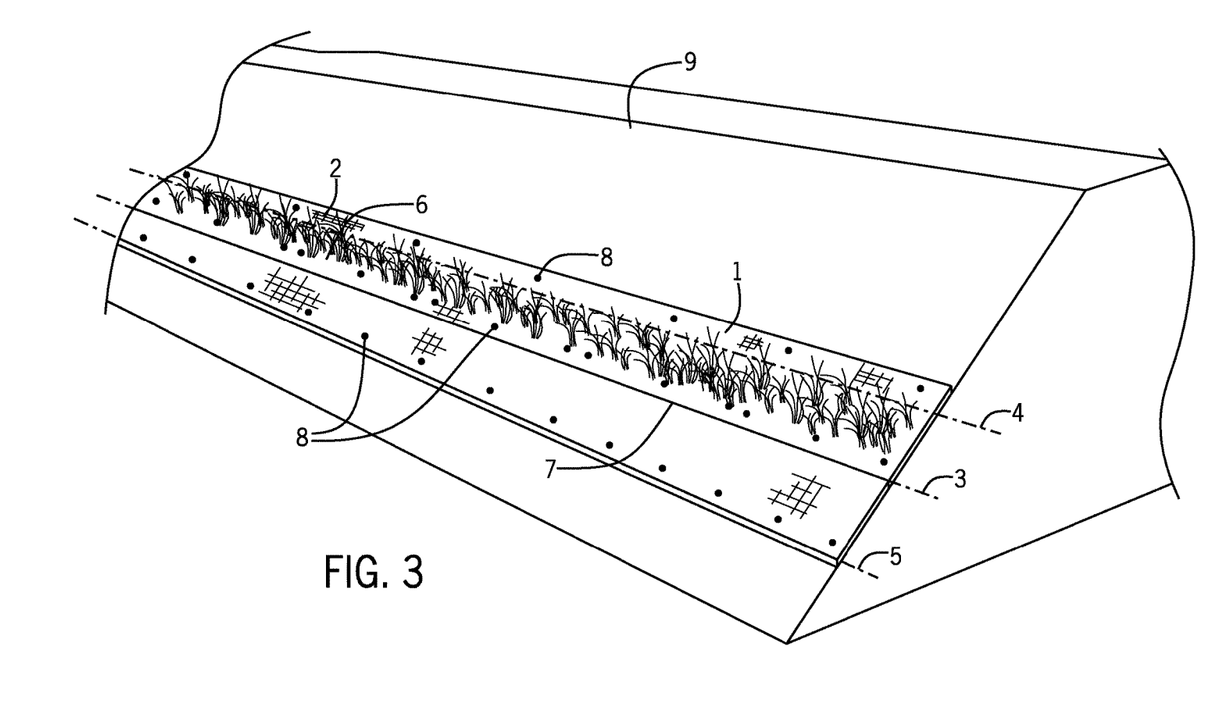
FIG. 3 illustrates a perspective view of the system of FIG. 2.

FIG. 3 is a perspective view of a simple embodiment of FIG. 2, wherein the base matrix layer 2 is about 7.5 feet wide in a direction substantially perpendicular to the shoreline 7, and is positioned on the earthen slope 9 in 90 foot long sheets in a direction substantially parallel to the shoreline 7. The base matrix layer 2 covers the earthen slope 9 from just above mean higher high water (MHHW) 4 through mean tide level 3 ending at mean lower low water (MLLW) 5. Also, the pre-planted narrow matrix strip 6 is about 30 inches wide in a direction substantially perpendicular to the shoreline 7, and is positioned on the base matrix layer 2 with the bottom of the pre-planted narrow matrix strip 6 at mean tide level 3. Each pre-planted narrow matrix strip 6 is about 15 feet long in a direction substantially parallel to the shoreline 7. Anchor pins 8, best shown in FIG. 8B, are driven through the base matrix layer 2 and pre-planted narrow matrix strip 6 into the earthen slope 9 below at predetermined locations to secure the layers 2, 6 and conform them to the earthen slope 9 below. The precise placement of the anchor pins 8 and wire mesh is determined by a number of factors local to the installation site, typically the soil conditions, topology of the earthen slope, and wave energy along the shoreline.

Figure 4:
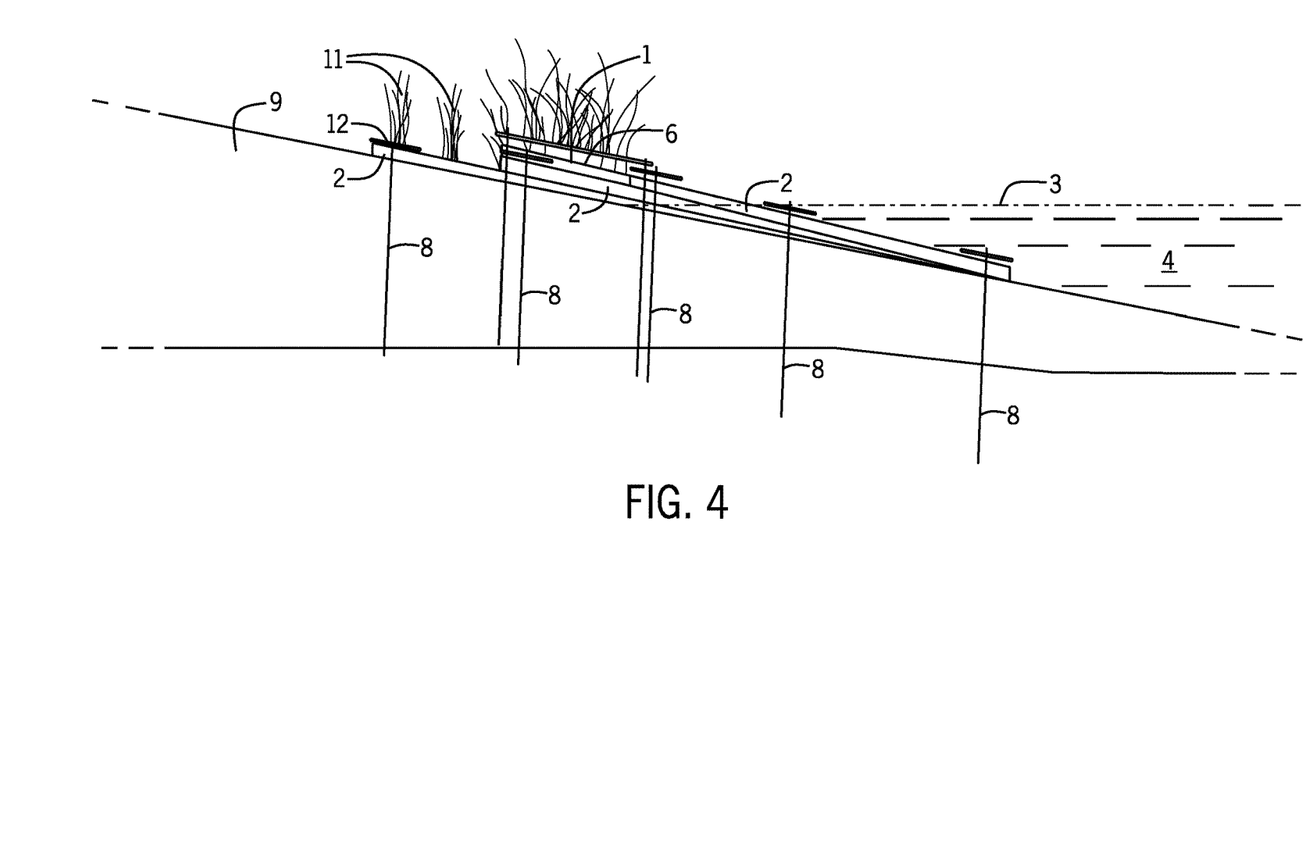
FIG. 4 illustrates a more preferred embodiment, right after installation, depicting three base matrix layers in a progressive overlapping configuration creating a living shoreline with pre-grown vegetation.

Another embodiment shown in FIG. 4 depicts the invention immediately after installation, wherein three base matrix layers 2 are employed in at least a partially overlapping configuration so that a thicker matrix is available for erosive wave energy protection at the shoreline 7, and to fully cover the shoreline between MLLW and MHHW on more shallow slopes. The base matrix layers 2 include selected base layer plants 11 inserted through base matrix layer plant holes 12 cut through the base matrix layers 2. As with the vegetation in the pre-planted narrow matrix strip 6, it will be appreciated that a variety of other plants may also be suitable, including vegetation having equivalent rooting and propagation characteristics. The selected base layer plants 11 in the base matrix layer 2 should have rooting and propagation characteristics sufficient to establish a natural anchor for the base matrix layer 2 into the earthen slope 9 below. The selected plants in the base matrix layer 2 are planted in two or more rows, and advantageously provide a substantial root mass, which grows through the base matrix layer 2 and eventually into the earthen slope 9 below.

A plurality of anchor pins 8 are driven through the base matrix layers 2 and pre-planted narrow matrix strip 6 into the earthen slope 9 at predetermined locations to secure the layers 2 and conform them to the earthen slope 9. Once again, the pre-planted narrow matrix strip 6 is positioned at roughly the mean tide level 3.

For shoreline areas that are subject to more high energy wave action, FIG. 4 illustrates a more preferred embodiment depicting three base matrix layers 2 in a progressive overlapping configuration. The three base matrix layers 2 are positioned progressively toward the water such that a portion of each of the base matrix layers 2 is in contact with and caused to conform to the earthen slope 9. In this embodiment, the selected base layer plants 11 in the base matrix layer 2 are inserted only on the base matrix layer 2 farthest from the waterline. As with the previous embodiments, anchors 8 are employed to secure the system to the earthen slope 9.

Figure 10:
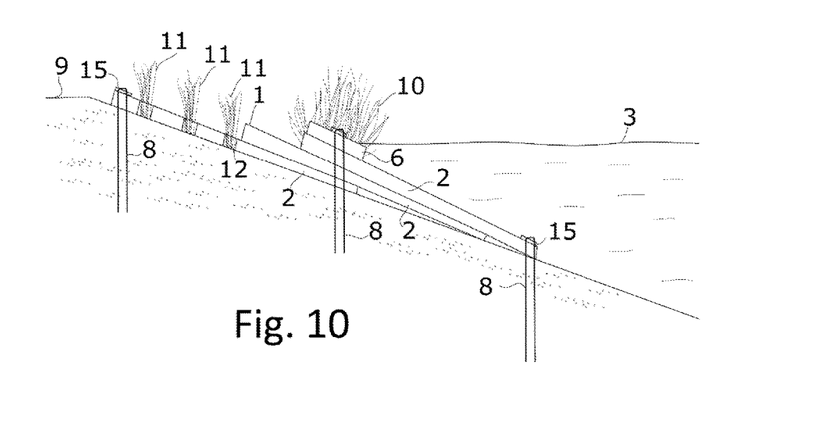
FIG. 10 illustrates an embodiment, right after installation, depicting base matrix layers in progressive overlapping configuration creating a living shoreline with pre-grown vegetation.
Figure 11:
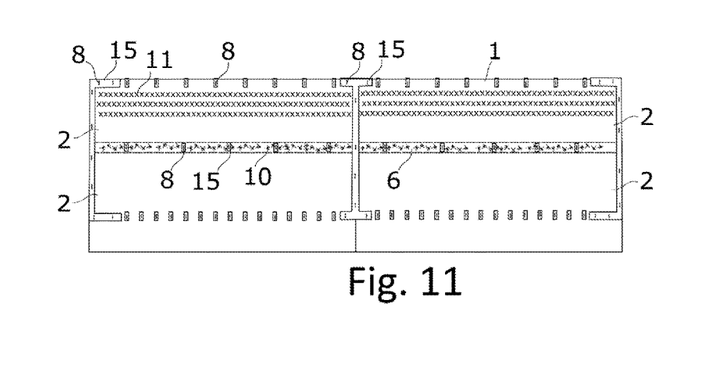
FIG. 11 illustrates a plan view of an embodiment, right after installation, depicting base matrix layers, pre-planted narrow matrix strip, anchor plates, and staples.

FIG. 10 and FIG. 11 illustrate an embodiment depicting living shoreline protection and stabilization system 1, multiple base matrix layers 2, mean tide level 3, pre-planted narrow matrix strip 6, anchor pin 8, modified earthen slope 9, pre-planted grasses 10, base layer plants 11, base matrix layer plant holes 12, and wire mesh plate 15.

Figure 5:
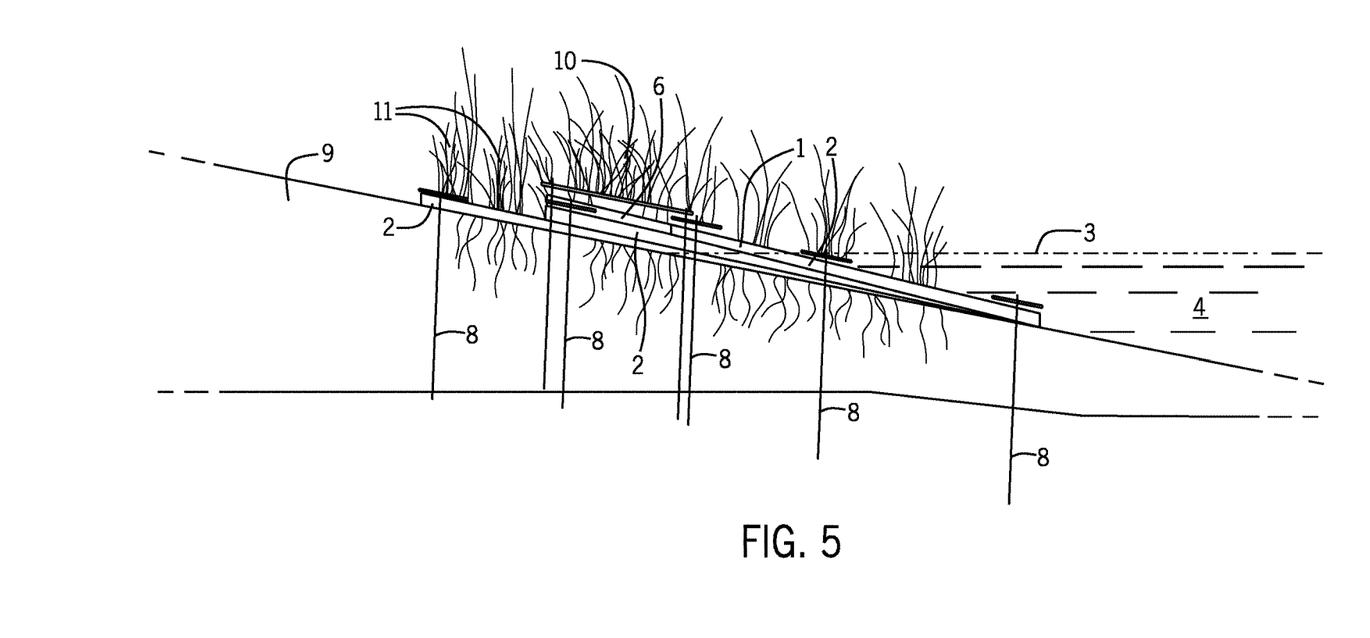
FIG. 5 illustrates the embodiment of FIG. 4 depicting growth of the plants in the base matrix layer and pre-planted narrow matrix strip approximately one year after installation.

FIG. 5 depicts the system as it might appear after about one year from installation. Note particularly the growth of the selected base layer plants 11 on the uppermost base matrix layer 2, and the manner in which the roots are extending further into the earthen slope 9 to create a natural anchor. Note also that the pre-planted grasses 10 on the pre-planted narrow matrix strip 6 are establishing deeper roots into the base matrix layers 2 and into the earthen slope 9, and that they are propagating rearward and forward into the water 4. This extends completely across the base matrix layers 2 over a typical 90 foot segment. The natural growth and propagation is essential to strengthening the earthen slope 9 against further erosion, attenuating wave energies, and establishing a "living shoreline".

With the definitions established by the National Oceanic and Atmospheric Administration (NOAA) in mind, and with specific reference to the figures, the present invention includes a method of protecting and stabilizing an earthen slope in contact with a body of water. As will be appreciated, all shorelines have a plurality of waterlines defined by the National Oceanic and Atmospheric Administration (NOAA) tidal datums and established based upon historical data of recorded tidal activity at specific locations.

In a preferred embodiment, the method comprises a first step of grading and shaping the earthen slope to establish a "modified" earthen slope having a suitably smooth topology and a predetermined slope. By suitably smooth topology, it is meant that the earthen slope should be sufficiently smooth to enable the base matrix layers to substantially conform to the earthen slope, and without significant bumps and other discontinuities that would otherwise interfere with uniform contact between the layers, the earthen slope, and the tidal waters.

The second step is the positioning of one or more base matrix layers 2 of a non-woven plastic matrix on the modified earthen slope 9, wherein the base matrix layer 2 at the lowermost point of the earthen slope is at least partially submerged in the water whereby the toe is at the mean lower low water (MLLW) 5 line as shown in FIG. 6. In order to accommodate the slope and provide base matrix layer coverage above mean higher high water (MHHW) 4 alternative embodiments with more than one base matrix layer 2 may be required.

Figure 7:
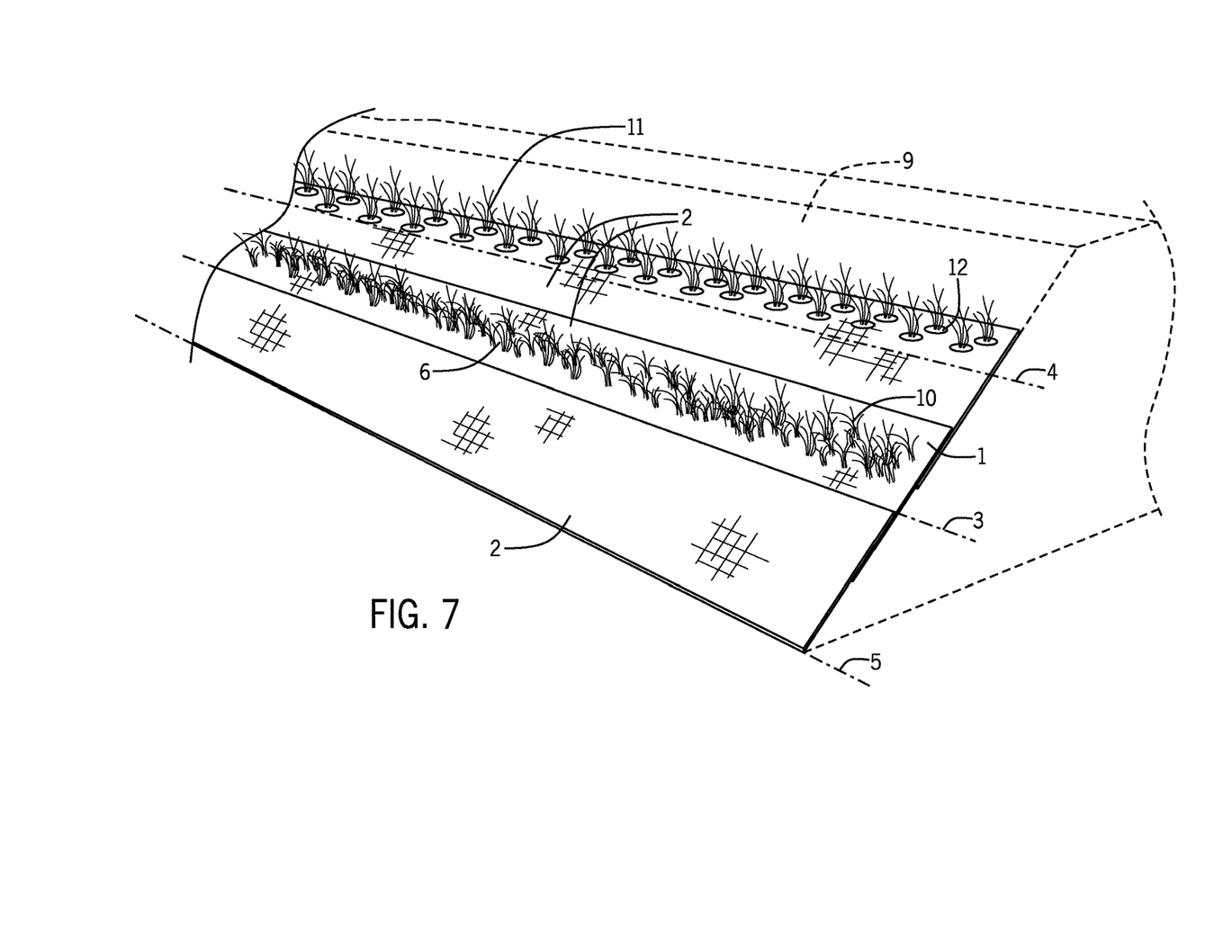
FIG. 7 illustrates the placement of the pre-planted narrow matrix strip and plants in the base matrix layer in relation to the tidal datums of mean tide level (MTL).

The third step is the positioning of a pre-planted narrow matrix strip 6 on the base matrix layer 2, wherein the pre-planted narrow matrix strip 6 bottom is positioned at mean tide level 3 as shown is FIG. 7. For purposes of this invention, this pre-planted narrow matrix strip 6 may also be referred to as a "pre-planted strip", because the pre-planted narrow matrix strip 6 is preferably pre-planted 45-60 days prior to installation with one or more pre-planted grasses 10, and wherein the pre-planted grasses 10 have rooting and propagation characteristics sufficient to establish growth of the pre-planted grasses 10 into the base matrix layer 2, the earthen slope 9 and toward the water. This creates the living shoreline.

The fourth step is the insertion of more selected base layer plants 11 into base matrix layer plant holes 12 cut through the uppermost base matrix layer 2 to form a hedgerow, wherein the selected plants in the base matrix layer 2 have rooting and propagation characteristics sufficient to establish a natural anchor for the base matrix layer 2 into the earthen slope 9.

Figure 8A:
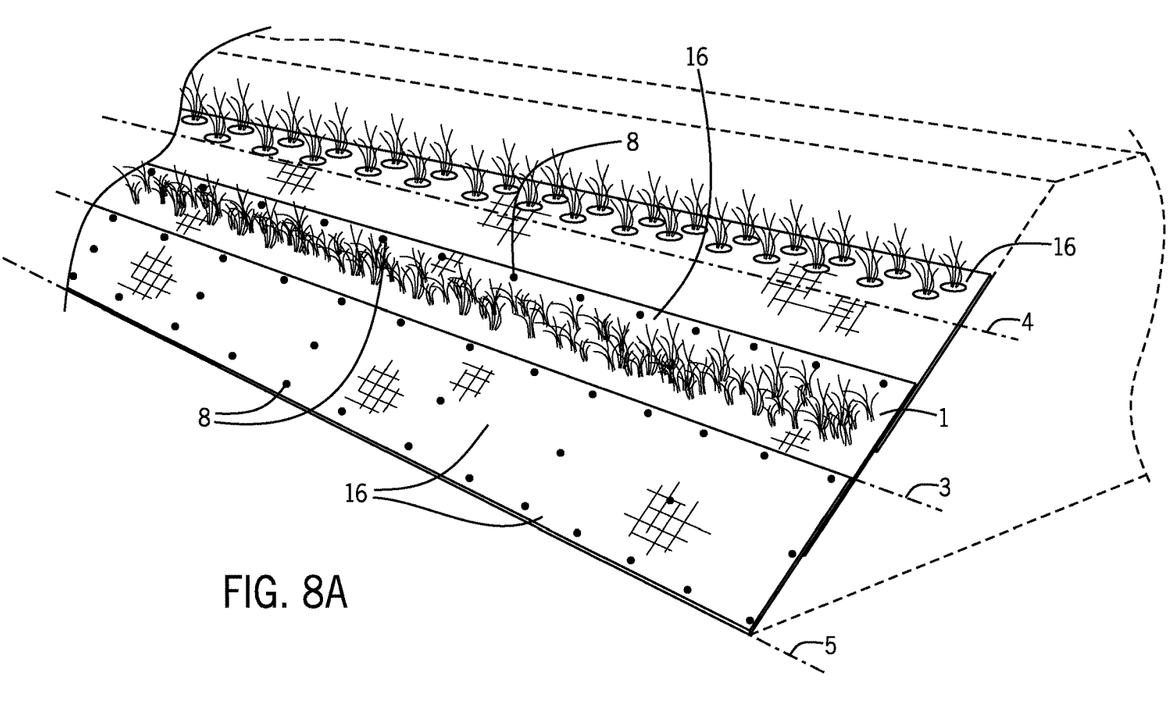
FIG. 8A illustrates a view of the anchoring system depicting the anchor pins and wire mesh.
Figure 8B:
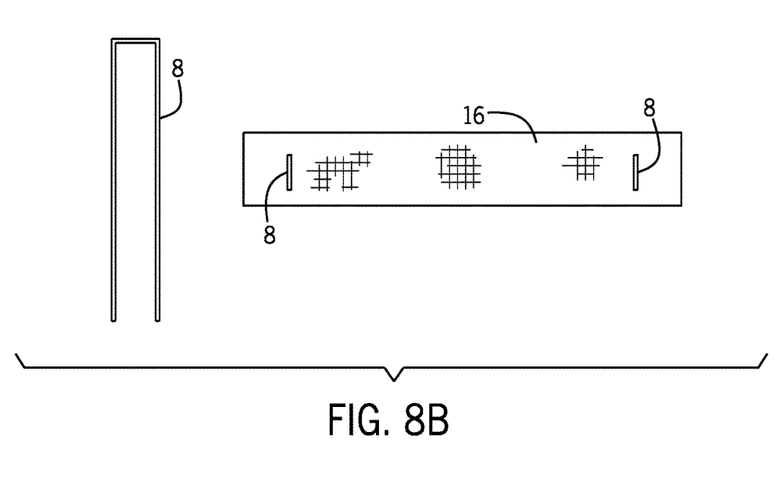
FIG. 8B illustrates an enlarged view of the anchor pins and wire mesh strips.

The fifth step is anchoring the base matrix layer 2 and the pre-planted narrow matrix strip 6 to the modified earthen slope 9 by a plurality of anchors 8 sufficient to cause the base matrix layer 2 to conform to the modified earthen slope 9 as shown in FIG. 8A. As explained elsewhere herein, the anchor system can be temporary, intermediate, or permanent based on material type and protective coatings. For such high energy areas and the embodiments shown in FIG. 4 and FIG. 5, improved anchoring systems are typically required, such as those depicted in FIG. 8A. In these anchoring systems, a wire mesh strip 16 as shown in FIG. 8B, having a plurality of holes is positioned on top of the layer to be anchored, following by insertion of an elongated reinforcement anchor pin 8 inserted through the wire mesh strip 16 then driven into the earthen slope 9. Using this arrangement, the anchor pin 8 forces a larger bearing surface of the base wire mesh strip 16 down on the layers 2, 6, resulting in a stronger anchoring to the earthen slope 9.

Figure 9:
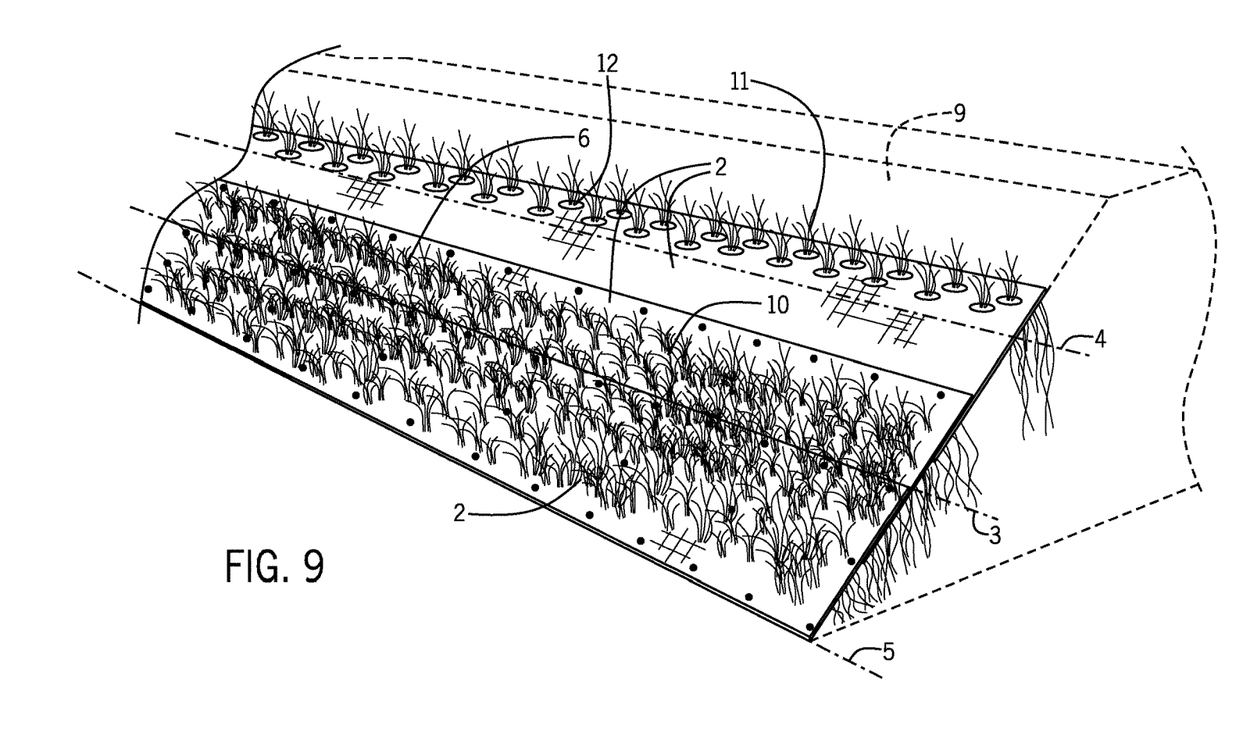
FIG. 9 illustrates a view of the pre-planted grasses of the narrow matrix strip growing into the water toward mean lower low water (MLLW).

The final steps are allowing the base matrix layers 2 to trap sediment accumulated through wave and tidal action, and allowing the pre-planted grasses 10 of the pre-planted narrow matrix strip 6 to propagate across the base matrix layer 2 and into the water 4, reaching the mean lower low water (MLLW) 5 line. Importantly, sediment trapping within the base matrix layers 2 provides a number of distinct advantages, namely: (1) an organic soil bed for planted vegetation to establish and grow, (2) an additional habitat for microorganisms and other aquatic life, and (3) creates weight and holding capacity in keeping the system securely affixed to the earthen slope 9. The effects of this process are shown best in FIG. 9 which depicts the system as it might appear after about one year from installation. Note particularly the growth of the selected base layer plants 11 on the uppermost base matrix layer 2, and the manner in which the roots are extending further into the earthen slope 9 to create a natural anchor. Note also that the pre-planted grasses 10 on the pre-planted narrow matrix strip 6 are establishing deeper roots into the base matrix layers 2 and into the earthen slope 9, and that they are propagating rearward and forward into the water 4. Such expanded growth extends completely across the base matrix layers 2 over a typical 90-foot segment. This plant growth toward the MLLW line 5 and extending their roots into the earthen slope 9 is critical to maximize the stabilization and protection of the earthen slope 9 in winter months when tides are consistently low. When this result is achieved, the stabilization system also establishes a "living shoreline" which is entirely compatible with and complementary to the flora and fauna of the shoreline.

In a more preferred arrangement, the bottom of the pre-planted narrow matrix strip 6 is positioned at mean tide level 3, while the selected base layer plants 11 in the uppermost base matrix layer are positioned slightly below mean higher high water (MHHW). Such arrangement is intended to keep the vegetation within watering conditions most suitable for rooting and growth.

In all of the embodiments described herein, it is preferable that the earthen slope 9 be shaped and graded to a predetermined condition prior to installation of the base matrix layers 2.

The present invention, also referred to as a "vegetated ecoshield", is cost-effective when compared to traditional forms of shoreline protection and stabilization. For years, levees, berms and terraces have relied on both hard and soft structures for protection. Hard structures or grey infrastructure such as rocks, bulkheads and cement mats are costly and time consuming to install. They also do not provide a green "living" component to the project. Soft structures such as vegetative seeding or manual planting is more economical, yet does not provide adequate protection from erosive waves, especially in high energy environments. Vegetation also requires time to establish and grow and could take as much as two years to properly root in and protect the base. During that time, daily waves continue to erode the newly constructed levee or terrace, thus never allowing for the vegetation to establish, root in, and grow. Vegetation may wash away if they are not strong enough or have not had enough time to anchor into the soil.

The vegetated ecoshield of the present invention provides both hard and soft structures. The base matrix layers 2 alone offer immediate protection to the earthen slope 9 by reducing wave heights by 40% as demonstrated in studies conducted by Dr. Chunyun Li of Louisiana State University. (http://www.martinecosystems.com/wp-content/uploads/2016/08/LSU-EcoShield-Final-Report.pdf) In addition, the pre-grown plants of the pre-planted narrow matrix strip 6 also provide an instant barrier to erosive waves because they have been allowed to establish with a minimum of 45 days of prior growth. The vegetated ecoshield is a combination of both hard and soft structures, which create a living shoreline for shoreline protection and bank stabilization.

The present invention is porous and lightweight allowing for ease of timely installation. Heavy equipment is rarely required which also minimizes the installation footprint on existing critical areas. Very little maintenance is required. There is typically 25% settlement on newly constructed levees, berms and terraces which requires the pushing down of anchor pins 8 quarterly for the first year.

The self-propagating nature of the vegetation results in new seedlings being dispersed. As vegetation grows, spreads, and multiplies, the surface area of the vegetated ecoshield increases, providing increased wave and wind shearing capabilities. This improves the outcomes of vegetation and vegetation plantings, as well as saves time by not having to replant again.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A shoreline protection method comprising:
   a) grading and shaping the earthen slope to establish a modified earthen slope;
   b) placing a first nonwoven plastic matrix strip along the modified earthen slope such that a portion of the first nonwoven plastic matrix strip is above a mean tide water line wherein the first nonwoven plastic matrix strip is between 7 and 8 feet wide in a direction substantially perpendicular to the mean tide water line and wherein the first nonwoven plastic matrix strip is between 30 and 100 feet long in a direction substantially parallel to the mean tide water line;
   c) placing a second nonwoven plastic matrix strip along the modified earthen slope such that a portion of the second nonwoven plastic matrix strip is above the mean tide water line wherein the second nonwoven plastic matrix strip is between 7 and 8 feet wide in the direction substantially perpendicular to the mean tide water line, wherein the second nonwoven plastic matrix strip is between 30 and 100 feet long in the direction substantially parallel to the mean tide water line and wherein the second nonwoven plastic matrix strip abuts the first nonwoven plastic matrix strip at a first joint;
   d) placing a third nonwoven plastic matrix strip along the modified earthen slope such that a majority of the third nonwoven plastic matrix strip is below the mean tide water line, wherein the third nonwoven plastic matrix strip is between 7 and 8 feet wide in the direction substantially perpendicular to the mean tide water line, wherein the third nonwoven plastic matrix strip is between 30 and 100 feet long in the direction substantially parallel to the mean tide water line and wherein the third nonwoven plastic matrix strip overlaps the first nonwoven plastic matrix strip;
e) placing a fourth nonwoven plastic matrix strip along the modified earthen slope such that a majority of the fourth nonwoven plastic matrix strip is below the mean tide water line wherein the fourth nonwoven plastic matrix strip is between 7 and 8 feet wide in the direction substantially perpendicular to the mean tide water line, wherein the fourth nonwoven plastic matrix strip is between 30 and 100 feet long in the direction substantially parallel to the mean tide water line, wherein the fourth nonwoven plastic matrix strip abuts the third nonwoven plastic matrix strip at a second joint and wherein the second nonwoven plastic matrix strip overlaps the fourth nonwoven plastic matrix strip;
f) placing a fifth nonwoven plastic matrix strip comprising a grass rooted therein by at least 45 days of prior grass growth above the first nonwoven plastic matrix strip and the third nonwoven plastic matrix strip such that the fifth nonwoven plastic matrix strip overlaps the first nonwoven plastic matrix strip and the third nonwoven plastic matrix strip;
g) positioning a first anchor plate over both the first joint and the second joint wherein the first anchor plate has a plurality of holes;
h) driving a first elongate metal staple through the plurality of holes such that the first elongate metal staple occupies a first hole and a second hole from the plurality of holes and driving a second elongate metal staple through the plurality of holes such that the second elongate metal staple occupies a third hole and a fourth hole from the plurality of holes, such that the first anchor plate secures each of the first nonwoven plastic matrix strip, the second nonwoven plastic matrix strip, the third nonwoven plastic matrix strip, the fourth nonwoven plastic matrix strip and the fifth nonwoven plastic matrix strip to the modified earthen slope at the mean tide water line;
i) forming a line of cylindrical holes in the first nonwoven plastic matrix strip and the second nonwoven plastic matrix strip;
j) planting a line of grass plugs in the modified earthen slope such that the line of grass plugs extends through the line of cylindrical holes.

2. The shoreline protection method of claim 1 wherein each of the first nonwoven plastic matrix strip, the second nonwoven plastic matrix strip, the third nonwoven plastic matrix strip, and the fourth nonwoven plastic matrix strip conforms to the modified earthen slope.

3. The shoreline protection method of claim 1 wherein a third elongate metal staple and a second anchor plate secure a long edge of the first nonwoven plastic matrix strip to the modified earthen slope, wherein the second anchor plate is smaller than the first anchor plate.

4. The shoreline protection method of claim 1 wherein a fourth elongate metal staple and a third anchor plate secure a long edge of the second nonwoven plastic matrix strip to the modified earthen slope, wherein the third anchor plate is smaller than the first anchor plate.

5. The shoreline protection method of claim 1 wherein a fifth elongate metal staple and a fourth anchor plate secure a long edge of the third nonwoven plastic matrix strip to the modified earthen slope, wherein the fourth anchor plate is smaller than the first anchor plate.

6. The shoreline protection method of claim 1 wherein a sixth elongate metal staple and a fifth anchor plate secure a long edge of the fourth nonwoven plastic matrix strip to the modified earthen slope, wherein the fifth anchor plate is smaller than the first anchor plate.

7. The shoreline protection method of claim 1
a) wherein each of the first nonwoven plastic matrix strip, the second nonwoven plastic matrix strip, the third nonwoven plastic matrix strip, and the fourth nonwoven plastic matrix strip conforms to the modified earthen slope;
b) wherein a third elongate metal staple and a second anchor plate secures a long edge of the first nonwoven plastic matrix strip to the modified earthen slope, wherein the second anchor plate is smaller than the first anchor plate;
c) wherein a fourth elongate metal staple and a third anchor plate secures a long edge of the second nonwoven plastic matrix strip to the modified earthen slope, wherein the third anchor plate is smaller than the first anchor plate;
d) wherein a fifth elongate metal staple and a fourth anchor plate secures a long edge of the third nonwoven plastic matrix strip to the modified earthen slope, wherein the fourth anchor plate is smaller than the first anchor plate;
e) wherein a sixth elongate metal staple and a fifth anchor plate secures a long edge of the fourth nonwoven plastic matrix strip to the modified earthen slope, wherein the fifth anchor plate is smaller than the first anchor plate; and
f) wherein the fifth nonwoven plastic matrix strip is between 24 and 36 inches wide in the direction substantially perpendicular to the mean tide water line.

8. The shoreline protection method of claim 1 wherein the fifth nonwoven plastic matrix strip is between 24 and 36 inches wide in the direction substantially perpendicular to the mean tide water line.

* * * * *